United States Patent [19]

Kashimoto

[11] 3,824,622

[45] July 16, 1974

[54] MULTICHANNEL MAGNETIC HEAD

[75] Inventor: Mitsugi Kashimoto, Tokyo, Japan

[73] Assignee: Alps Electric Co., Ltd., Tokyo, Japan

[22] Filed: Apr. 20, 1973

[21] Appl. No.: 352,886

Related U.S. Application Data

[63] Continuation of Ser. No. 164,661.

[52] U.S. Cl. .................................. 360/121, 360/125

[51] Int. Cl. .................................. G11b 5/28

[58] Field of Search ....... 179/100.2 C; 340/174.1 F; 346/74 MC

[56] References Cited

UNITED STATES PATENTS

| | | | |
|---|---|---|---|
| 2,475,421 | 7/1949 | Camras | 179/100.2 C |
| 2,872,530 | 2/1959 | Jolly | 179/100.2 C |
| 3,311,710 | 3/1967 | Murphy et al. | 179/100.2 C |
| 3,316,359 | 4/1967 | Sakasegawa | 179/100.2 C |
| 3,400,386 | 9/1968 | Sinnott | 340/174.1 F |

*Primary Examiner*—Alfred H. Eddleman

[57] ABSTRACT

A multichannel magnetic head of the type combining the functions of erasing, recording and playback comprises a plurality of magnetic core units of two types separated by magnetic shielding means. The first type of core unit is of the conventional three-leg construction utilizing a common central core and is effective to generate recording and/or erasing signals. The second type of core is used for playback only and comprises a single generally U-shaped core having a balanced playback winding. The two types of core units are arranged alternately along the head in a direction perpendicular to tape travel whereby inductive coupling within each unit is virtually eliminated, thereby to maintain a good signal to noise ratio and an improved tone quality.

1 Claim, 4 Drawing Figures

PATENTED JUL 16 1974

3,824,622

INVENTOR
MITSUGI KASHIMOTO
BY James and Franklin
ATTORNEYS

MULTICHANNEL MAGNETIC HEAD

This invention relates to a magnetic recording apparatus and, in particular, to such apparatus in which the three functions of recording, reproducing and erasing are combined in one magnetic head.

The recently available magnetic heads of the type herein described are generally of the three-leg type and comprise a common central core operatively magnetically connected to an erasing core and a recording/reproducing core upon which are wound an erasing and a recording/reproducing coil, respectively. The erase and record/playback sections thus share a common central leg thereby to provide a substantial reduction in the spacing between the erasing and recording gaps. Moreover, the recording and reproduction (playback) functions are, in accordance with this design, both effected through the same magnetic circuit—the recording/reproducing magnetic coil. The recording medium, generally in the form of a magnetic tape, is moved past the gaps defined between the common core and the erasing and recording/reproducing cores, respectively, whereby the magnetic flux developed in these cores is impressed upon the magnetic tape to erase and record or reproduce, respectively.

With the recent advent of multichannel sound systems there has been developed the multitrack magnetic tape system in which sound may be recorded or reproduced on or from a plurality of parallel tracks on the magnetic tape. For this purpose a plurality of magnetic core units of the three-leg type described above are disposed in closely spaced parallel relationship on a single magnetic head. Thus, for example, a pair of such units is generally provided for use with the standard dual track stereo tape the spacing between the magnetic core units corresponding to the spacing of the tape tracks. In order to reduce crosstalk between these closely spaced channels a highly permeable metal shield is generally mounted between adjacent magnetic core units. While this type of shielding generally accomplishes its intended purpose, it has been found that this arrangement significantly increases inductive coupling between the erase and record/reproduce coils of each magnetic core unit, thereby decreasing the signal to noise ratio of those units.

It is a primary object of the present invention to provide a multichannel magnetic head having a novel magnetic core arrangement combining the functions of recording, reproducing and erasing and at the same time providing an improved signal to noise ratio.

It is another object of the present invention to design a multichannel magnetic head of the type described in which the magnetic circuit for reproduction or playback is effectively separated from the erasing and recording magnetic circuits thereby to significantly eliminate undesirable inductive coupling.

To these ends, the present invention comprises a compound type magnetic head having a plurality of magnetic core units and adapted to combine the functions of recording, reproducing and erasing. In accordance with the present design, a multichannel magnetic head is provided with a plurality of magnetic core units of two types, one type being adapted to provide reproduction or playback only and the other type combining the functions of erasing and recording, said two types being arranged alternately in spaced relation on the head perpendicular to the direction of tape travel. Conventional magnetic shielding is provided between units whereby reproduction or playback is accomplished from a multitrack magnetic tape using a reproduction core unit having a balanced winding independently of the recording and erasing core units. Accordingly, external inductive coupling is limited and a good signal to noise ratio is maintained.

To the accomplishment of the above, and to such other objects as may hereinafter appear, the present invention relates to an improved multichannel magnetic head as defined in the appended claims and as described herein the reference to the accompanying drawings, in which:

In a conventional prior art multichannel head of the type described, each channel is provided with a magnetic core assembly adapted to provide magnetic signals for erasing and/or recording on a magnetic medium and also adapted to receive magnetic signals or impulses from said medium and to amplify and reproduce same in the form of the originally recorded sound through a speaker system.

Figure 1:
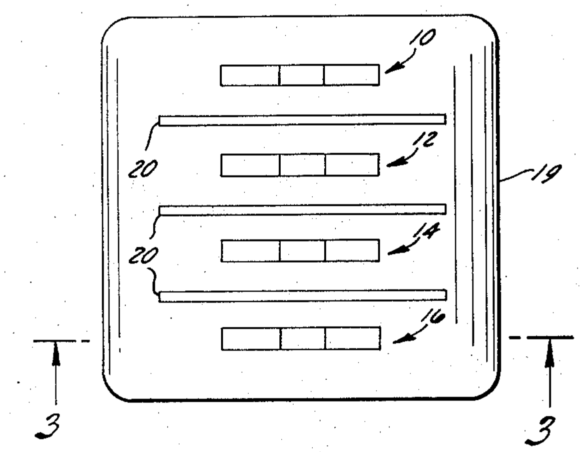
FIG. 1 is a plan view of a conventional prior art multichannel magnetic head, each channel incorporating means for erasing, recording and reproducing.

The magnetic medium is generally in the form of a multitrack tape, each track being aligned with one of the above mentioned magnetic core units and being moved therepast. Purely by way of example, a four channel magnetic head of this type is schematically illustrated in FIG. 1, in which four identical magnetic core units generally designated 10, 12, 14 and 16, respectively, are disposed within a housing 19. These units are separated, in the usual manner, by shields 20 preferably in the form of thin plates of highly permeable material interposed between adjacent core units. Housing 19 is preferably also formed of highly permeable material so that the magnetic flux associated with each of the four channels is confined within a substantially magnetically insulated compartment defined by the shields 20 and the walls of the housing 19.

Figure 3:
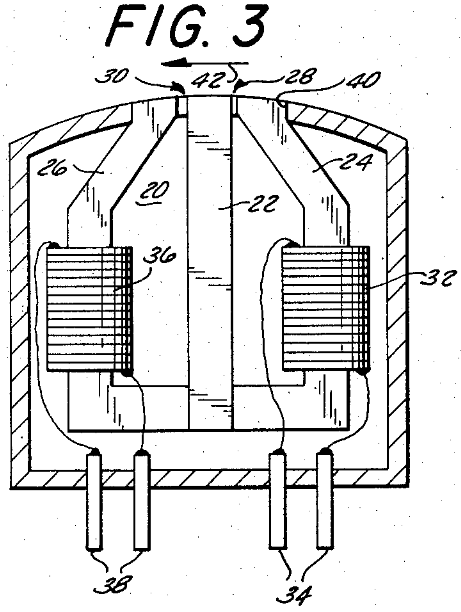
FIG. 3 is a cross sectional view taken along the line 3—3 in FIG. 1 and FIG. 2.

As best shown in FIG. 3, each core unit is of the three-leg type and comprises a common central core 22, an erasing core 24, and a recording/reproducing core 26. The erasing core 24 and the recording/reproducing core 26 are generally U-shaped and are operatively magnetically connected to one end of the central common core 22 to provide a continuous magnetic flux path. The other end of the common core 22 is spaced from erasing core 24 by an erasing gap 28 and from the recording/reproducing core 26 by a recording/reproducing gap 30. An erasing coil 32 is wound around erasing core 24 and is operatively connected to an erasing circuit (not shown) by means of a pair of terminals 34. A recording/reproducing coil 36 is wound around recording/reproducing core 26 and operatively electrically connected to a recording/reproducing circuit (not shown) by means of another pair of terminals 38.

As illustrated the operative cores extend into an aperture 40 in the curved tape-engaging face of the head, the magnetic tape being adapted to pass successively over the erasing and recording/reproducing gaps 28 and 30, respectively, in the direction indicated by arrow 42.

In accordance with the above construction, when the erasing circuit is activated, current flows through erasing coil 32 and magnetic flux is generated through the magnetic circuit defined by common core 24, erasing core 22 and erasing gap 28. Likewise, when the recording circuit is activated current flows through coil 36 and a magnetic flux is generated by the recording signal and flows through the magnetic circuit defined by recording/reproducing core 26, common core 22 and recording/reproducing gap 30. In addition, magnetic flux generated by the high frequency bias current in the erasing coil is introduced into the above defined recording magnetic circuit in the usual manner.

The three-leg construction described above has been found particularly useful in the recently available multitrack systems because of the small spacing between the erase and record gaps which facilitates accurate alignment and provides good tape-to-gap contact. In such multitrack systems a plurality of tracks or channels are provided on a single side of magnetic tape. For example, in an eight track stereo system, four pairs of tracks in a single endless loop configuration takes the place of the standard dual track stereo tape. As a result, a great reduction in the width of the guard band between adjacent tracks is required. Accordingly, recording and erasing signals must be rather narrowly confined within the operative track. The shields 20, in FIG. 1, provide one effective solution to this problem. However, it has been found that the use of shielding as described above tends to increase inductive coupling between the unbalanced erase and record/reproduce coils of a given unit, thereby substantially decreasing the signal to noise ratio of the unit.

Figure 2:
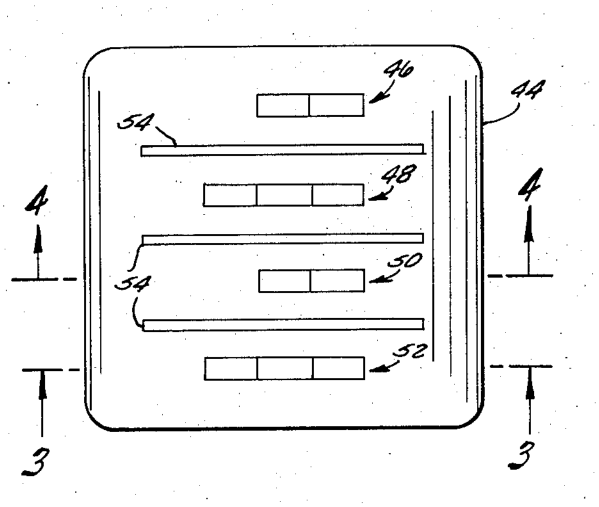
FIG. 2 is a plan view of a preferred embodiment of a multichannel magnetic head designed in accordance with the present invention, alternate channels being designed for erasing and/or recording and reproducing or playback, respectively.

The present invention provides a simple and effective solution to this inductive coupling problem. The present invention is best shown in FIG. 2, wherein by way of example only, a four-channel stereo magnetic head is schematically illustrated. As there shown, the head comprises a housing 44 within which four magnetic core units 46, 48, 50 and 52 are mounted. Conventional magnetic shielding 54 is provided between adjacent core units. Core units 48 and 52 are of the three-leg type and may be identical in construction to those illustrated and described with reference to FIG. 1. However, unlike the units of the conventional head, the gap 30 and coil 36 provide only for recording of audio signals onto the magnetic tape. Reproduction or playback from signals already impressed on the tape is provided by core units 46 and 50.

Figure 4:
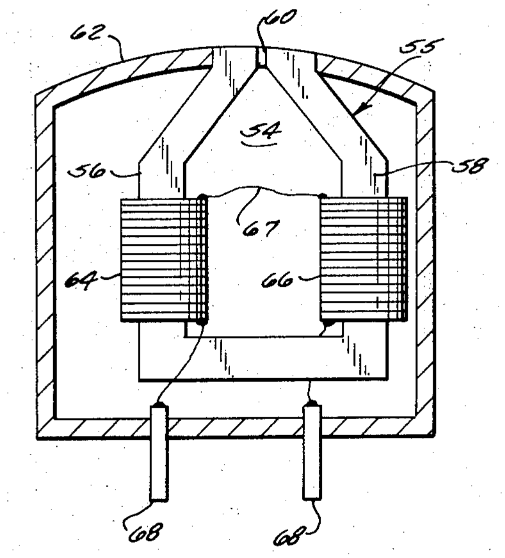
FIG. 4 is a cross sectional view taken along the line 4—4 of FIG. 2.

As best shown in FIG. 4, these units comprise a single generally U-shaped magnetic core 55 having two legs 56 and 58 extending in generally parallel relationship and converging at their upper ends to define a small playback gap 60 therebetween. The converging ends of legs 56 and 58 terminate at the curved tape-engaging surface 62 of the housing 44, whereby the magnetic tape slides directly over the gap 60. A coil 64 is wound around leg 56 and a second coil 66 is wound around leg 58. Coils 64 and 66 are connected between terminals 68 in series by a connecting lead 67 to produce a balanced winding configuration, terminals 68 being operatively connected to a suitable audio amplifying circuit.

In accordance with the above construction, during a recording and/or erasing operation, the operative dual stereo tape tracks are aligned, respectively, with core units 48 and 52 whereby the appropriate magnetic flux generated in the erasing and recording circuits passes through gaps 28 and 30, respectively, and onto the operative tape surface. During reproduction or playback, the operative tape tracks are laterally shifted relative to the housing 44 so as to be aligned with core units 46 and 50, whereby the operative signals are picked up from the tape surface at gap 60 and converted into the appropriate audio signals by coils 64 and 66 and the associated amplifying circuit. As a result of the use of separate units having balanced windings for reproduction or playback, the operation of the present head is accompanied by little or no inductive coupling and thus little reduction in signal to noise ratio. Accordingly, there is a marked improvement in tone quality. Moreover, the present invention makes possible an even greater reduction in the width of the guard band between adjacent tracks on multitrack magnetic tapes, which results in significant economies in the tape industry.

It will be appreciated from the foregoing that I have designed an improved multichannel magnetic head which is inexpensive to manufacture and provides a significantly improved tone quality. The present head is particularly useful in multitrack stereo systems and virtually eliminates crosstalk between magnetic cores on the same unit.

While only a single preferred embodiment of this invention has been herein specifically disclosed, it will be apparent that many variations may be made thereto without departing from the spirit and scope of the invention, as defined in the following claims.

I claim:

1. A magnetic head for erasing, recording, or playing back signals on a magnetic tape comprising a housing, a plurality of magnetic core units of each of first and second types respectively, said first type being adapted to provide both erase and record signals to said tape, said second type being adapted to pick up recorded signals from said tape and reproduce same, each of said core units being exposed at a surface of said housing and being so constructed and arranged as to operatively cooperate with tape traveling in a given direction relative thereto, said first and second type of units being oriented on said housing with their respective directions of tape travel parallel to one another said core units of said first and second types respectively being disposed on said housing spaced from and alternating with one another in a direction perpendicular to said direction of tape travel, and shielding on said housing between adjacent ones of said core units.

* * * * *